(No Model.)
W. A. PLACE.
POTATO BUG HARVESTER.
No. 601,165. Patented Mar. 22, 1898.
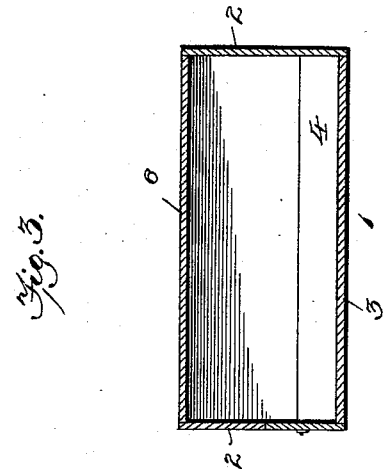
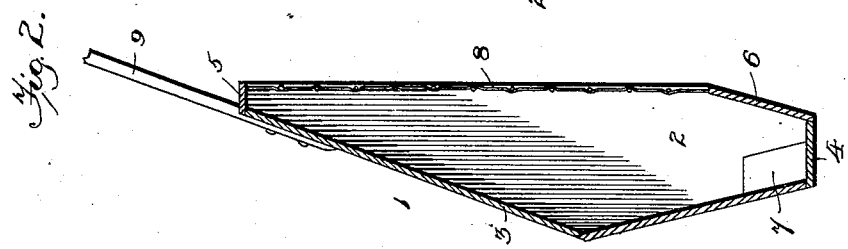
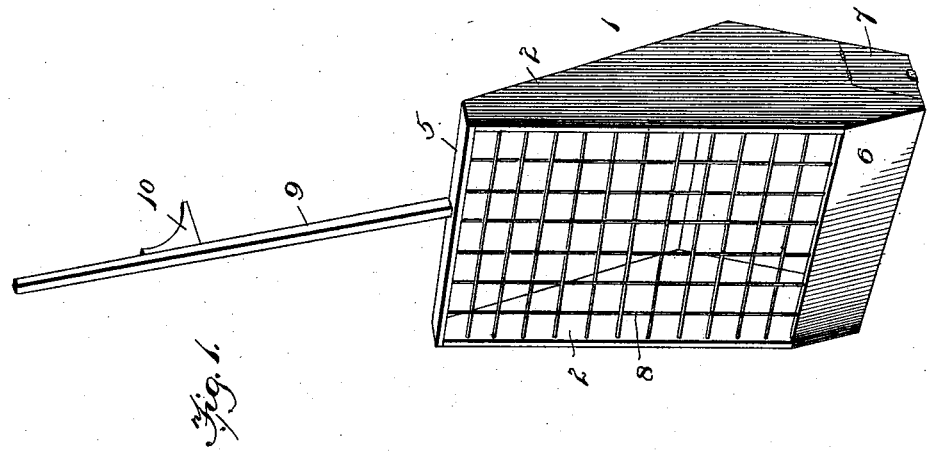
Witnesses
Inventor
Willard A. Place,
By his Attorneys,
C. A. Snow & Co.

UNITED STATES PATENT OFFICE.

WILLARD ALLEN PLACE, OF LA PORTE, INDIANA.

POTATO-BUG HARVESTER.

SPECIFICATION forming part of Letters Patent No. 601,165, dated March 22, 1898.

Application filed August 20, 1897. Serial No. 648,939. (No model.)

*To all whom it may concern:*

Be it known that I, WILLARD ALLEN PLACE, a citizen of the United States, residing at La Porte, in the county of La Porte and State of Indiana, have invented certain new and useful Improvements in Potato-Bug Harvesters; and I do hereby declare the following to be a full, clear, and exact description of the invention, such as will enable others skilled in the art to which it appertains to make and use the same.

The invention relates to improvements in potato-bug harvesters.

The object of the present invention is to improve the construction of potato-bug harvesters and to provide a simple, inexpensive, and efficient device adapted to be conveniently carried with one hand and capable of presenting a flat surface to the plants, so that the latter will not be injured by it in shaking potato-bugs from them.

The invention consists in the construction and novel combination and arrangement of parts, as hereinafter fully described, illustrated in the accompanying drawings, and pointed out in the claim hereto appended.

In the drawings, Figure 1 is a perspective view of a potato-bug harvester constructed in accordance with this invention. Fig. 2 is a longitudinal sectional view. Fig. 3 is a transverse sectional view.

Like numerals of reference designate corresponding parts in all the figures of the drawings.

1 designates a receptacle comprising oppositely-tapered sides 2, a back or bottom 3, ends 4 and 5, and a transverse front or top portion 6, connecting the sides adjacent to the end 4 and forming a pocket.

The bottom or back 3 is angularly bent to conform to the configuration of the adjacent edges of the sides, and it may be constructed of any suitable material.

At the left-hand corner of the pocket of the receptacle is a door 7, by means of which the bugs can be removed, and the front or top of the receptacle between the transverse portion 6 and the end 5 is open and provided with a wire-netting 8 of large mesh, as shown, to present a flat surface to the plants operated on.

The handle 9 is attached to the inner end 5 of the receptacle and is provided with a grip 10, by means of which the device can be readily carried.

In use the harvester is carried in the left hand and the open front placed adjacent to the plants, while with a light wide paddle the plants are struck or drawn across the meshes of the wire-netting, so that the bugs are dislodged and fall into the pocket. The blows given by the paddle are not sufficient to injure the plants, and as the device presents a flat supporting-surface to them they are not broken or otherwise injured.

The invention has the following advantages: The device is exceedingly simple and inexpensive in construction. It enables plants to be effectively operated on without liability of breaking or otherwise injuring them, and when not in use the device may be placed upon the ground or other supporting-surface without permitting the captured insects to escape, so that the device does not have to be retained in the hand until it is emptied.

What I claim is—

A device of the class described comprising a receptacle composed of oppositely-tapering sides 2, presenting angularly-disposed front and rear edges, the angularly-bent bottom or back, the ends 4 and 5, and the transverse top portion connecting the sides at the outer end of the device and forming a pocket, a handle, a wire-netting arranged at the front of the receptacle between the pocket and the inner end and presenting a flat surface to the plants, whereby the latter are prevented from being broken or otherwise injured, and a door arranged at the pocket of the receptacle, substantially as and for the purpose described.

In testimony whereof I have signed this specification in the presence of two subscribing witnesses.

WILLARD ALLEN PLACE.

Witnesses:
R. FREDRICK,
D. A. KINGSLEY.